United States Patent
Robinette et al.

(10) Patent No.: US 7,568,402 B2
(45) Date of Patent: Aug. 4, 2009

(54) METHOD AND APPARATUS FOR FAULT-TOLERANT TRANSMISSION GEAR SELECTOR LEVER POSITION DETERMINATION

(75) Inventors: Richard E. Robinette, Grosse Pointe Woods, MI (US); Peter E. Wu, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 397 days.

(21) Appl. No.: 11/462,653

(22) Filed: Aug. 4, 2006

(65) Prior Publication Data
US 2008/0028879 A1    Feb. 7, 2008

(51) Int. Cl.
*F16H 59/00* (2006.01)
*B60Q 1/00* (2006.01)

(52) U.S. Cl. .......................... 74/335; 477/906; 340/456

(58) Field of Classification Search ............. 74/335, 74/473.1, 473.3; 477/34, 906, 907; 340/456; 701/62, 63, 64
See application file for complete search history.

(56) References Cited

U.S. PATENT DOCUMENTS 5,561,416 A * 10/1996 Marshall et al. ............. 340/456
6,205,874 B1 * 3/2001 Kupper et al. ................. 74/335
6,550,351 B1 * 4/2003 O'Reilly et al. ............... 74/335
6,773,369 B2 * 8/2004 Altenkirch et al. .......... 475/132
2004/0079181 A1 * 4/2004 von Haeften ................. 74/335

FOREIGN PATENT DOCUMENTS

FR    2818725 A1 *   6/2002

OTHER PUBLICATIONS

English Translation of DE10159861 (German equivalent of FR2818725), Dec. 3, 2008, http://epo.worldlingo.com/wl/epo/epo.html.*

* cited by examiner

*Primary Examiner*—Roger Pang

(57) ABSTRACT

A fault-tolerant gear selector lever position apparatus is described. Included is a first sensor operable to detect each position, and a second sensor operable to detect subsets of the positions. A first controller monitors the second sensor, and a second controller monitors the first sensor. The second controller identifies and communicates one of the positions to the first controller, and the first controller validates the position and communicates the position to a control system. The lever is applicable to a power transmission device. Each sensor preferably comprises digital encoding sensor; the first sensor generates a unique signal for each position, and the second sensor generates a unique signal for each subset of the positions, preferably a unique signal for each of Park, Reverse, Neutral, and Forward Drive. The controllers identify faults in the sensors, and communicate and act accordingly.

20 Claims, 3 Drawing Sheets

METHOD AND APPARATUS FOR FAULT-TOLERANT TRANSMISSION GEAR SELECTOR LEVER POSITION DETERMINATION

CROSS-REFERENCE TO RELATED APPLICATIONS

This application claims priority from U.S. Provisional Application No. 60/703,913, filed Jul. 29, 2005, entitled METHOD AND APPARATUS FOR FAULT-TOLERANT TRANSMISSION SHIFT LEVER POSITION.

TECHNICAL FIELD

This invention pertains generally to vehicle transmission systems, and more specifically to an apparatus and method for fault-tolerant transmission gear selector lever position determination.

BACKGROUND OF THE INVENTION

Designers of transmission systems for use in motor vehicles are required to implement a transmission gear selector lever having a minimum of four positions, or ranges, in a sequence of Park, Reverse, Neutral, and Forward Drive, as specified in the Federal Motor Vehicle Safety Standards (49 C.F.R. 571). This includes a further requirement that any transmission having more than one forward gear ratio must provide an additional gear position to enable engine braking. Most modern applications include at least five positions for the transmission gear selector lever, i.e. Park, Reverse, Neutral, Drive, and Low. Vehicle manufacturers typically provide additional ranges to allow the operator more control over vehicle performance. In general, there is a discrete number of valid gear selector lever positions of which a subset corresponds to Forward Drive ranges.

All automatic transmissions, including those that are electronically-controlled, must be able to determine transmission gear selector lever position selected by an operator to effectively control operation of the transmission to satisfy the operator's request. A typical transmission control system includes a sensor operable to monitor position of the transmission gear selector lever, and a control module operable to decode the sensor information and command actuation of specific devices in the transmission in response thereto. Determination of transmission gear selector lever position is deemed safety-critical, as a fault may cause vehicle movement to be commanded in an unintended direction. To avoid vehicle movement in an unintended direction, various approaches have been used, including a mechanical/hydraulic interlock system, wherein the transmission gear selector lever operates a hydraulic valve that prevents Reverse position from being obtained when a Forward Drive position is selected and vice versa.

A transmission system having a gear selector lever decoupled from the hydraulic system, such as in a shift-by-wire system used in an electric/fuel hybrid system, is precluded from employing such a mechanical/hydraulic interlock. Another mechanism is required to prevent a potentially incorrect reading of transmission gear selector lever position. One form of hybrid transmission system uses an architecture having identical clutching and power flow for both Forward and Reverse ranges, utilizing a shift-by-wire architecture that does not lend itself to traditional methods of differentiating between Forward and Reverse. Implementing a mechanical/hydraulic interlock system may be impractical due to an inability to provide the needed functionality and packaging constraints.

Prior art systems that have been offered to address the aforementioned concern include use of a manual valve with hydraulic redundancy to prevent inappropriate direction; use of dual analog sensors to determine gear selector lever position; use of fault detection using comparison and thresholding; use of digital encoding of gear selector lever position using multiple identical encoders and using a voting type architecture based on majority vote; and, use of a separate control module dedicated to reading and providing secure gear selector lever position.

Therefore, what is needed is a system that executes a command for vehicle propulsion and direction that is consistent with an operator's intent, and provides redundancy in the event that a controller becomes non-functional, especially in a distributed controller architecture.

SUMMARY OF THE INVENTION

It is therefore an object of this invention to provide a method and apparatus capable of fault-tolerant gear selector lever position determination for a transmission, including application in a fuel/electrical hybrid transmission employing a shift-by-wire mechanism. The invention described herein enables continued operation in event of loss of a single control module, i.e. provides a level of redundant controllers; provides fault tolerance, i.e eliminates vehicle disablement and operator walk-home; eliminates safety-critical faults; works with existing controllers having pre-defined input/output ('I/O') circuitry designed for sliding contact switches; reduces component costs, by allowing the use of inexpensive digital switches in place of redundant analog sensors; and, enables critical packaging constraints of front wheel drive ('FWD') valve body to be achieved by removal of a hydraulic manual valve.

In accordance with the present invention, a method and apparatus to determine a position of a lever having a plurality of operator-selectable positions is claimed, comprising: a first lever-position sensor operable to detect each of the operator-selectable positions, and a second lever-position sensor operable to detect each of a subset of the operator-selectable positions. There is a first controller adapted to monitor the second lever-position sensor, and a second controller adapted to monitor the first lever-position sensor. The second controller is operable to identify and communicate a specific one of the operator-selectable positions to the first controller, and the first controller is operable to validate the specific one of the operator-selectable positions and communicate the validated specific one of the operator-selectable positions to a control system.

An aspect of the invention includes the lever having a plurality of operator-selectable positions comprises a gear selector lever for a power transmission device, wherein the first lever-position sensor is operable to generate a unique signal for each of the operator-selectable positions, preferably comprising a digital encoding sensor operable to generate the unique signal for each of the operator-selectable positions. The second lever-position sensor is operable to generate a unique signal for each of a subset of the operator-selectable positions, determined based upon an operator-intended direction of rotation of an output of the power transmission device, and also comprises a digital encoding sensor. The second digital encoding sensor is operable to generate a unique signal for each of Park, Reverse, Neutral, and Forward Drive.

Another aspect of the invention comprises the first controller adapted to identify a fault in the second lever-position sensor, and communicate the fault to the second controller.

Another aspect of the invention comprises the second controller adapted to identify a fault in the first lever-position sensor, to identify a fault in the first controller, and to communicate a default lever position to the control system when a fault is identified in one of the first and second lever-position sensors and the first controller. Furthermore, the control system is operable to generate a diagnostic fault code when the fault identified in one of the first and second lever-position sensors and the first controller is communicated thereto.

Another aspect of the invention includes the lever comprising a gear selector lever for a power transmission device, wherein the first lever-position sensor is operable to generate a unique signal for each of the operator-selectable positions. The second lever-position sensor is operable to generate a unique signal for each of a subset of operable-selectable positions, wherein each signal is determined based upon an operator-intended direction of rotation of an output of the power transmission device.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
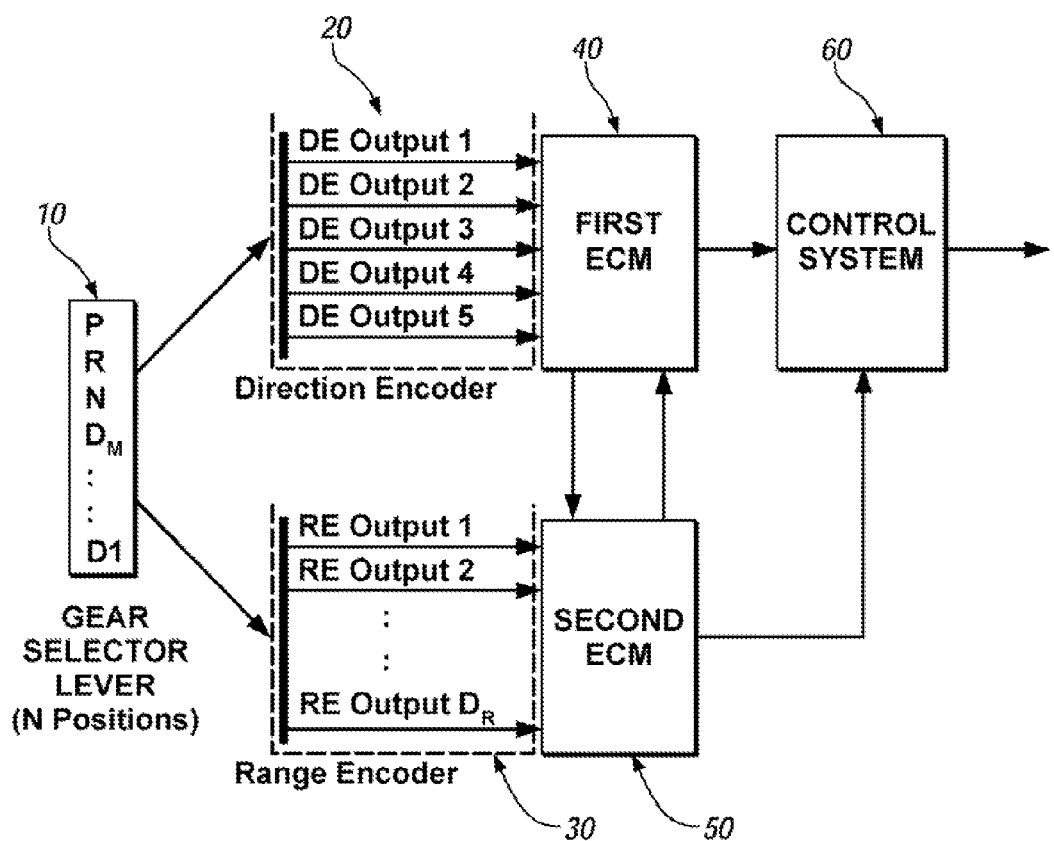
FIG. 1 is a schematic diagram, in accordance with the present invention.

Referring now to the drawings, wherein the showings are for the purpose of illustrating the invention only and not for the purpose of limiting the same, FIG. 1 shows a schematic diagram of an apparatus for fault-tolerant hardware and software architecture for determining position of a gear selector lever for a power transmission device, as can be applied on a motorized vehicle, that has been constructed in accordance with an embodiment of the invention. The exemplary system includes a transmission gear selector lever 10 having a discrete number of operator-selectable positions. First and second gear selector lever position sensors 30, 20 are operatively attached thereto. Signal output from the first gear selector lever position sensor 30 is output to a second electronic control module 50. Signal output from the second gear selector lever position sensor 20 is output to a first electronic control module 40. The first and second electronic control modules 50, 40 have bi-directional communications therebetween. The first and second control modules each communicate to a control system 60, e.g. one operable to provide overarching control of a powertrain for a vehicle. Details of the system hardware are provided herein.

The first and second gear selector lever position sensors 30, 20 each comprise a digital encoding device operable to provide digital logic signals to the electronic control modules 40, 50, as described hereinbelow. The electronic control modules ("ECM") 40, 50 described herein include an ability to monitor discrete input/output ('I/O') including that from first and second gear lever position sensors 30, 20. The transmission gear selector lever 10 comprises a operator-manipulated device operative to be place in one of a plurality of discrete positions, e.g. Park, Reverse, Neutral, Drive, Intermediate, and Low ('PRNDIL'). First and second gear selector lever positions sensors 30, 20 are operatively attached to the gear selector lever 10. The first and second gear selector lever position sensors 30, 20 each comprise a digital encoder that provides discrete outputs for each of the valid gear selector lever positions, e.g. Park, Reverse, Neutral, Drive, Intermediate, and Low ('PRNDIL'), as shown with reference to Table 1, below. The technology used to implement the digital encoder is known to a skilled practitioner, and practical considerations typically influence the choice of digital encoder. The individual positions for each of the valid gear selector lever positions are typically identified by mechanical detents in the transmission gear selector lever 10 mechanism (not shown).

Referring again to FIG. 1, the hardware architecture shows first and second gear selector lever position sensors 30, 20, comprising digital encoder devices, attached to the transmission gear selector lever 10 such that each sensor is operative to detect and discern distinct gear selector positions. The first and second gear selector lever position sensors 30, 20 are permanently mechanically aligned with each other to eliminate a possibility of misalignment of the two sensors. The first sensor 30 comprises a digital encoder that provides a unique set of discrete outputs for each valid positions of the gear selector lever, e.g. Park, Reverse, Neutral, Drive, D3, D2, D1 in this embodiment, ('PRNDIL'), and is referred to as a Range Encoder. The second sensor 20 comprises a digital encoder that provides a unique set of discrete outputs for each of a plurality of valid subsets of positions of the gear selector lever positions, each subset preferably correspondingly to an operator-selected rotational direction of output of the transmission device. In this embodiment there are four subsets, comprising four unique outputs corresponding to one of the Park, Reverse, Neutral, and Forward Drive positions. The second sensor is referred to as a Direction Encoder. In this embodiment, all Forward Drive positions produce the same output from the second sensor 20. The two sensors 20, 30 are preferably electrically isolated, in terms of power supply, ground and signal output, so that a single electrical fault can not disable both sensors. The discrete or digital outputs of the first sensor 30 and the second sensor 20 is shown as below, with reference to Table 1, wherein "1"represents a digital high output, and "0" represents a digital low output.

TABLE 1

| Shift Lever Position | First Sensor 30 Range Encoder | Second Sensor 20 Direction Encoder |
| --- | --- | --- |
| Park | 1001 | 10101 |
| Reverse | 1100 | 01001 |
| Neutral | 0101 | 11010 |
| Drive | 0110 | 00110 |
| D3 | 0011 | 00110 |
| D2 | 1010 | 00110 |
| D1 | 1111 | 00110 |

The controller architecture uses two electronic control modules ('ECM'), comprising the first ECM 40 and the second ECM 50. The first ECM 40 is signally connected to and adapted to monitor the second sensor 20, or direction encoder, and decoding the output thereof. The second ECM 50 is signally connected to and adapted to monitor the first sensor 30, or range encoder, and decoding the output thereof. The first ECM 40 and second ECM 50 are signally connected, preferably employing a high-speed bi-directional communications link, such as a serial peripheral interface bus ('SPI') comprising a known full-duplex synchronous serial data link permitting direct communication between the devices. The first ECM provides control signals to the transmission device to control operating direction of the vehicle. The second ECM 50 may provide additional control signals. Each ECM 40, 50 include an ability to monitor first and second gear selector lever position sensors 30, 20 by way of a discrete input/output ('I/O').

Each ECM is preferably a general-purpose digital computer generally comprising a microprocessor or central processing unit, read only memory (ROM), random access memory (RAM), electrically programmable read only memory (EPROM), high speed clock, analog-to-digital (A/D) and digital-to-analog (D/A) circuitry, and input/output circuitry and devices (I/O) and appropriate signal conditioning and buffer circuitry. Each ECM has set of control algorithms, comprising resident program instructions and calibrations stored in ROM and executed to provide the respective functions of each computer.

Algorithms for control and state estimation in each ECM are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25, 50 and 100 milliseconds during ongoing engine and vehicle operation. Alternatively, algorithms may be executed in response to occurrence of an event.

Encoding patterns, show with reference again to Table 1, and executed with the Range and Direction Encoders are necessary for redundant, fault tolerant operation. Specifically, the Range Encoder 30 implements an encoding that allows detection of at least one fault, while the Direction Encoder 20 implements an encoding that allows detection of two faults and correction of a single fault. The greater fault tolerance of the Direction Encoder 20 allows it to be given greater weight in the even that the Range and Direction Encoders disagree on the direction of operation.

Referring again to Table 1, the Range Encoder 30 preferably provides an output comprising a plurality of discrete digital outputs, the quantity of which is determined based upon the quantity of N valid gear selector lever positions which are reduced using a $\log_2(N)$, plus a parity bit for error detection. Therefore, in a typical system having less than four valid gear selector lever positions, the range encoder 30 provides three discrete outputs; in a system having four to seven valid gear selector lever positions, the range encoder provides four discrete outputs; and in a system having eight to fifteen valid gear selector lever positions, the range encoder provides five discrete outputs. Valid transmission gear selector lever positions are assigned encodings having a specific (even or odd) parity. The encodings for the valid positions preferably include a property exhibited by a rule requiring changing from one valid position to any other valid position requires changing state of at least two discrete outputs. Thus, when the transmission gear selector lever 10 is in a valid position, it cannot be misinterpreted as another valid position unless two discrete outputs are in an incorrect state due to faults. A single fault causes the parity check to fail, allowing the software to flag the presence of an invalid condition. The output state corresponding to a disconnected Range Encoder 30 is used to identify this condition and cannot be used to indicate a valid position. The specific assignment of encodings for each position is subject to practical considerations.

The Direction Encoder 20 preferably provides an output comprising a plurality of five discrete digital outputs, as shown in Table 1. Two of the outputs combine to provide a unique digital signal based upon a directional output of the transmission, wherein four states, i.e. Park, Reverse, Neutral, Forward Drive are each uniquely encoded. Three additional discrete outputs, comprising an Error Correcting Code ('ECC') output are also included. The output state corresponding to an output resulting when the Direction Encoder 20 is disconnected is used to identify this condition and cannot be used to indicate a valid direction state. Digital encodings for each of the valid directional outputs or states are chosen such that changing from one valid direction state to any other valid direction state results in changing state (from digital 1 to digital 0, or from digital 0 to digital 1) of three of the five discrete outputs. Thus, when the transmission gear selector lever 10 is in one of the valid positions, the direction state cannot be misinterpreted as another valid direction state unless three of the discrete outputs are each in an incorrect state due to faults. The specific assignment of encodings for each direction state is subject to practical considerations. Adhering to this assignment of encodings allows the software to effectively correct any single fault. The properties of an ECC ensure that the correct valid code can be recovered from an invalid code when only one output is corrupted. When a double fault exists such that two discrete outputs are in an incorrect state, and it is not detectable, the error correction logic may produce an erroneous result. This situation is addressed by validation logic described hereinbelow.

The software architecture for the system preferably effects continued operation in the presence of a single fault, and ensures that a Neutral propulsion state is commanded when a secondary fault occurs. The software architecture implements a "limp-home" capability in the event of a single ECM fault. Each of the ECMs 40, 50 is preferably operable to support a subset of the control logic and monitor the control signals input to the other ECM 50, 40.

Figure 2:
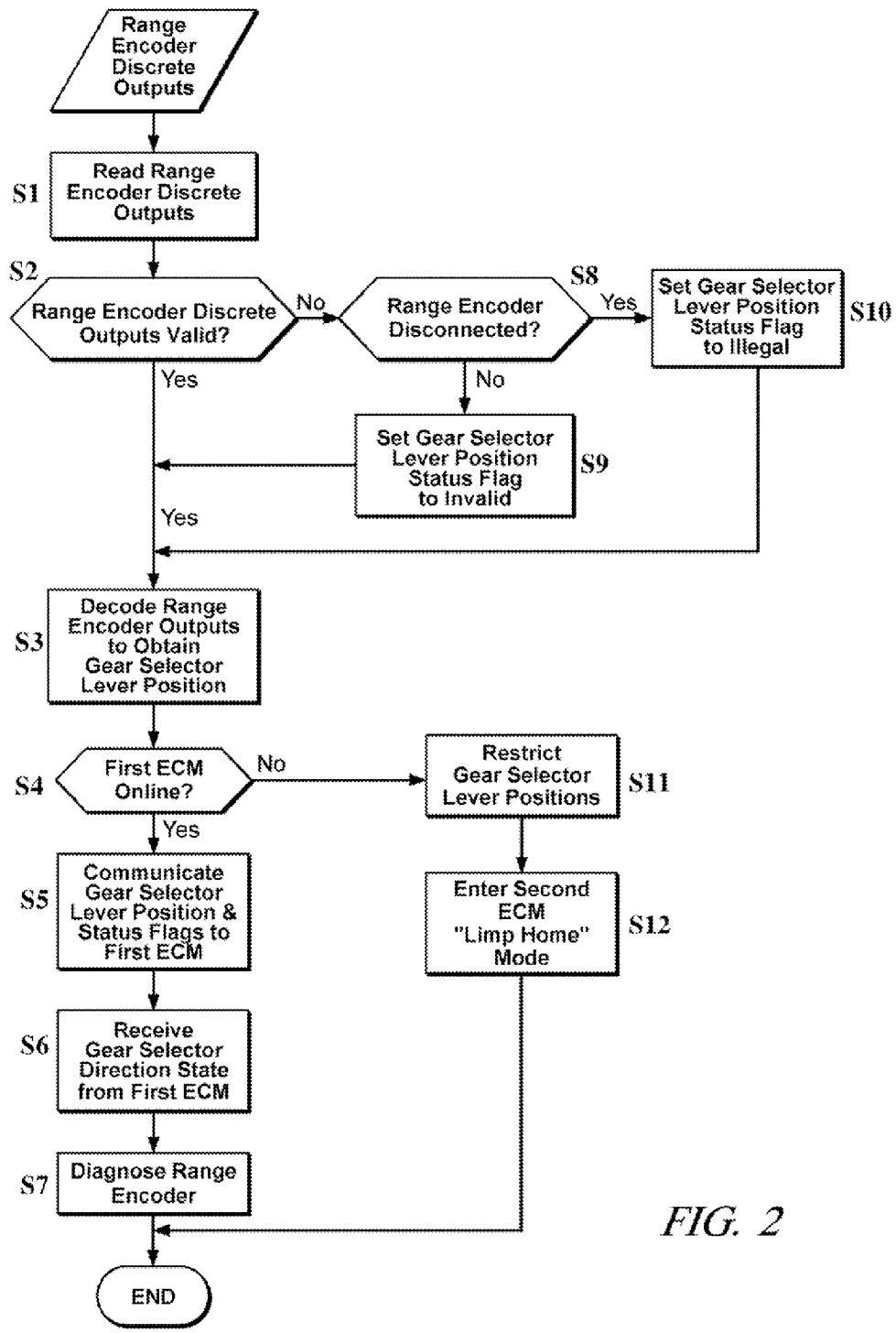
FIGS. 2 and 3 are algorithmic flowcharts, in accordance with the present invention.

Referring now to FIG. 2, a flow chart representative of an algorithm operable to process input signals from the Range Encoder 30 is described, which is preferably executed in the second ECM 50. The second ECM 50 reads and decodes output from the Range Encoder 30 at step S1. The resulting position is either a valid transmission gear selector lever position as determined at steps S2, S3, an indication of an invalid state as determined at step S9, or an illegal state as determined at steps S8, or S10 when the code corresponds to a signal indicating the Range Encoder is disconnected. Gear selector lever position information is communicated to the First ECM at steps S4, S5 to permit signal validation. When the first ECM 40 is offline, the second ECM 50 commands a "limp home" mode, including placing a restriction on which transmission gear selector lever positions are accepted at steps S11, S12. The second ECM 50 also diagnoses whether either of the Range Encoder outputs are stuck in a logic-high or a logic-low state at step S7. The second ECM receives a direction signal as determined by the first ECM 40 from the Direction Encoder 20 to facilitate this, as shown in step S6.

Figure 3:
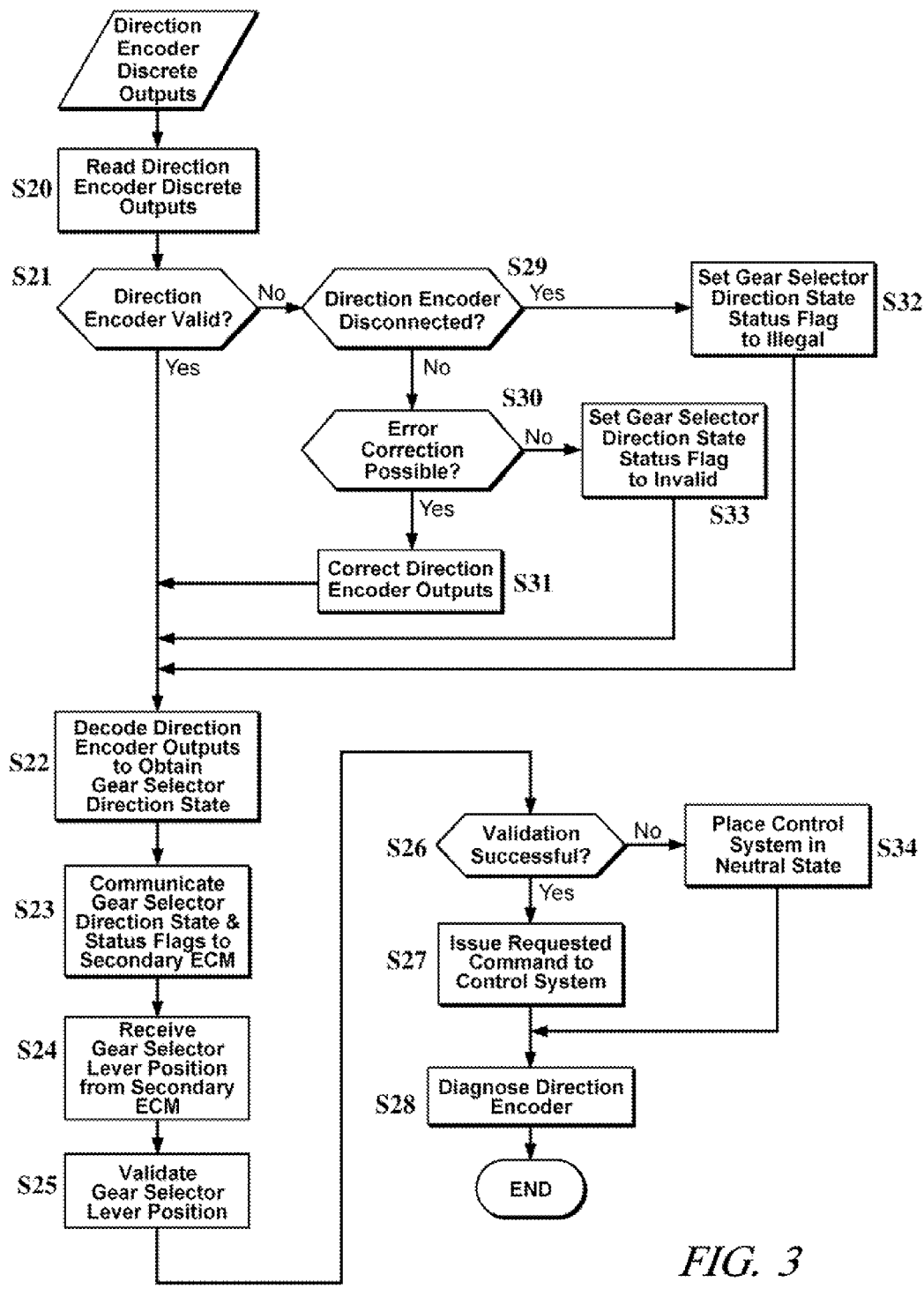

Referring now to FIG. 3, a flow chart representative of an algorithm operable to process input signals of the direction encoder and other analysis to be performed by the first ECM 40 is now described. The first ECM 40 reads and decodes output from the Direction Encoder in steps S20 and S22. When the first ECM 40 determines that the code obtained from the Direction Encoder 20 indicates the Direction Encoder is electrically disconnected in step S29, it flags the direction state as illegal, as shown in step S32. When the Direction Encoder is properly electrically connected, but does not correspond to a valid code, indicating a correctable error, as shown in step S30, the first ECM attempts to error correct to see whether a valid code is obtained in step S31. When a correction to direction code is accomplished, the direction state is set to that valid state and a flag is set to indicate that error correction was accomplished. Otherwise, the error flag is set to an invalid state as shown in step S33. The first ECM 40 communicates with the second ECM 50 via the bidirectional communications bus, sending direction information in step S23 and receiving transmission gear selector lever position in step S24. The first ECM validates the transmission gear selector lever position from the Second ECM in step S25, using the validation logic given in Table 2, below. The logic truth table shown with reference to Table 2 allows the first ECM to determine whether to accept the transmission gear selector lever position in step S26, use the direction state it has determined from the Direction Encoder in step S27, or place the transmission and hence the vehicle powertrain system in Neutral state in step S34. When the Direction Encoder is indicating an invalid or illegal state S28, a subset of the valid transmission gear selector lever positions are allowed, which effectively comprises the "limp-home" mode. A single point fault analysis of the Range Encoder implementation is used to determine which ranges are allowed. The result of the validation logic is used by first ECM 40 to command operation of the powertrain.

TABLE 2

First ECM Validation Logic

| Transmission Gear Selector Lever Position (Second ECM) | Transmission Direction State | Direction Match | Validation Result |
| --- | --- | --- | --- |
| Valid | Valid | Y | Transmission Gear selector lever Position |
| Valid | Valid | N | Neutral |
| Valid | Error Corrected | Y | Transmission Gear selector lever Position |
| Valid | Error Corrected | N | Neutral |
| Valid | Invalid or Illegal | N/A | Transmission Gear selector lever Position when in allowed subset, Neutral otherwise |
| Invalid | Valid | N/A | Use Transmission Direction State (Assign default range for Forward Drive position) |
| Invalid | Error Corrected | N/A | Neutral |
| Invalid | Invalid or Illegal | N/A | Neutral |
| Illegal or Second ECM Offline | Valid | N/A | Transmission Direction State (Assign default range for Forward Drive position) |
| Illegal or Second ECM Offline | Error Corrected | N/A | Neutral |
| Illegal or Second ECM Offline | Invalid or Illegal | N/A | Neutral |

The first ECM 40 diagnoses each output of the Direction Encoder 20 as being stuck in a logic-high or logic-low state. The error correcting encoding used by the Direction Encoder 20 facilitates the identification of faulty outputs.

When the first ECM 40 is offline, the architecture allows the Second ECM 50 to assume control using a potentially limited set of functions, i.e., "limp-home". The second ECM 50 uses the logic given in Table 3 to determine system commands for the powertrain. When both the first ECM 40 and Second ECM 50 are offline, the vehicle is effectively disabled.

TABLE 3

Second ECM Limp Home Mode Logic

| Transmission Gear Selector Lever Position (Second ECM) | Limp Home Mode Result |
| --- | --- |
| Valid | Transmission Gear selector lever Position when in allowed subset, Neutral otherwise |
| Invalid or Illegal | Neutral |

Thus, a method and apparatus are provided to determine a position of a lever having a plurality of operator-selectable positions. As previously referenced, this comprises a first lever-position sensor operable to detect each of the operator-selectable positions, e.g. the range encoder, and a second lever-position sensor operable to detect each of a plurality of subsets of the operator-selectable positions, e.g. the direction encoder. There is a first ECM adapted to monitor the second lever-position sensor, and a second ECM adapted to monitor the first lever-position sensor. The second ECM is operable to identify and communicate a specific one of the operator-selectable positions to the first controller, and the first ECM is operable to validate the specific one of the operator-selectable positions and communicate the validated specific one of the operator-selectable positions to a control system.

The invention has been described with specific reference to the preferred embodiments and modifications thereto. Further modifications and alterations may occur to others upon reading and understanding the specification. It is intended to include all such modifications and alterations insofar as they come with the scope of the invention.

Having thus described the invention, it is claimed:

1. Apparatus to determine a position of a transmission gear selector lever having a plurality of operator-selectable positions, comprising:
    a first lever-position sensor configured to detect each of the operator-selectable positions;
    a second lever-position sensor configured to detect each of a plurality of subsets of the operator-selectable positions, wherein each of the subsets of the operator-selectable positions consists of ones of the operator-selectable positions corresponding to a common rotational direction of an output of the transmission;
    a first control module configured to monitor only the second lever-position sensor;
    a second control module configured to monitor only the first lever-position sensor;
    the second control module configured to identify and communicate a currently detected one of the operator-selectable positions to the first control module;
    the first control module configured to validate the currently detected one of the operator-selectable positions based upon a currently detected one of the subsets of the operator-selectable positions, and communicate the validated currently detected one of the operator-selectable positions to a control system.

2. The apparatus of claim 1, wherein the first lever-position sensor comprises a sensor configured to generate a unique signal for each of the operator-selectable positions.

3. The apparatus of claim 2, wherein the first lever-position sensor further comprises a first digital encoding sensor configured to generate a unique discrete signal for each of the operator-selectable positions.

4. The apparatus of claim 3, wherein the second lever-position sensor further comprises a second digital encoding sensor configured to generate a unique discrete signal for each subset of operator-selectable positions.

5. The apparatus of claim 4, wherein each of the subsets of the operator-selectable positions corresponds to one of a Park, a Reverse, a Neutral, and a Forward Drive rotational direction of the output of the transmission.

6. The apparatus of claim 1, comprising the first control module configured to identify a fault in the second lever-position sensor.

7. The apparatus of claim 6, comprising the first control module configured to communicate the fault in the second lever-position sensor to the second control module.

8. The apparatus of claim 7, comprising the second control module configured to identify a fault in the first lever-position sensor.

9. The apparatus of claim 8, comprising the second control module configured to identify a fault in the first control module.

10. The apparatus of claim 9, comprising the second control module configured to communicate a default lever position to the control system when a fault is identified in one of the first and second lever-position sensors and the first control module.

11. The apparatus of claim 10, further comprising the control system configured to generate a diagnostic fault code when the fault identified in one of the first and second lever-position sensors and the first control module is communicated thereto.

12. The apparatus of claim 11, further comprising:
    the first lever-position sensor configured to generate a unique discrete signal for each of the operator-selectable positions, and,
    the second lever-position sensor configured to generate a unique discrete signal for each of the subsets of operator-selectable positions.

13. Method to determine a current transmission gear selector lever position from a plurality of transmission gear selector lever positions, comprising:
    encoding each of the positions with a respective first digital code that is unique from the other respective first digital codes using a first position sensor and outputting the first digital codes from the first position sensor;
    monitoring a currently output first digital code only with a first control module;
    encoding each of a plurality of subsets of the positions with a respective second digital code that is unique from the other respective second digital codes using a second position sensor, wherein each of the subsets of the positions consists of ones of the positions corresponding to a common rotational direction of an output of the transmission, and outputting the second digital codes from the second position sensor;
    monitoring a currently output second digital code only with a second control module;
    validating the current transmission gear selector lever position based upon the currently output first and second digital codes; and
    communicating the validated current transmission gear selector lever position to a control system.

14. The method of claim 13, further comprising identifying a fault related to one of the first and second sensors, the fault identified based upon a comparison of currently output first and second digital codes.

15. The method of claim 14, comprising communicating a default gear selector lever position when a fault is identified.

16. The method of claim 15, further comprising generating a diagnostic fault code when the fault is identified.

17. Apparatus for determining position of a transmission gear selector lever in a vehicle having a propulsion system equipped with an automatic transmission utilizing shift-by-wire shifting architecture and a distributed electronic controller architecture, comprising:
    a range encoder configured to provide a digital signal output for each valid transmission gear selector lever position;
    a direction encoder configured to provide digital signal outputs corresponding to Park, Reverse, Neutral, and Forward positions of the transmission gear selector lever, and, mechanically aligned with the range encoder;
    a first control module:
        configured to read and decode only the digital signal outputs from the direction encoder;
        configured to identify faults of the direction encoder;
        configured to validate a transmission gear selector lever position communicated from a second control module; and, configured to provide a control signal to the propulsion system comprising the validated transmission gear selector lever position; and, the second control module:

configured to read and decode only the digital signal output from the range encoder to determine transmission gear selector lever position;

configured to identify faults of the range encoder;

configured to communicate the transmission gear selector lever position to the first control module; and, configured to provide a control signal to the propulsion system comprising a limp-home mode when a fault is identified in one of the direction encoder, the range encoder, and the first control module.

18. The apparatus of claim 17, wherein the digital signal outputs corresponding to the Park, Reverse, Neutral, and Forward positions of the transmission gear selector lever comprise five-bit digital signals associated with valid direction states, and wherein three bits of each of the digital signals differ from three bits of all other of the digital signals.

19. The apparatus of claim 17, wherein the digital signal outputs corresponding to the Park, Reverse, Neutral, and Forward positions of the transmission gear selector lever comprise five-bit digital signals associated with valid direction states, and wherein two bits of each of the digital signals differ from two bits of all other of the digital signals.

20. The apparatus of claim 17, wherein the digital signal outputs for each valid transmission gear selector lever position comprise multi-bit digital signals associated with valid transmission gear selector lever positions, and wherein two bits of each of the digital signals differ from two bits of all other of the digital signals.

* * * * *